May 29, 1928.
J. BUCHLI
1,671,099
ELECTRIC LOCOMOTIVE CONSTRUCTION
Filed May 9, 1927
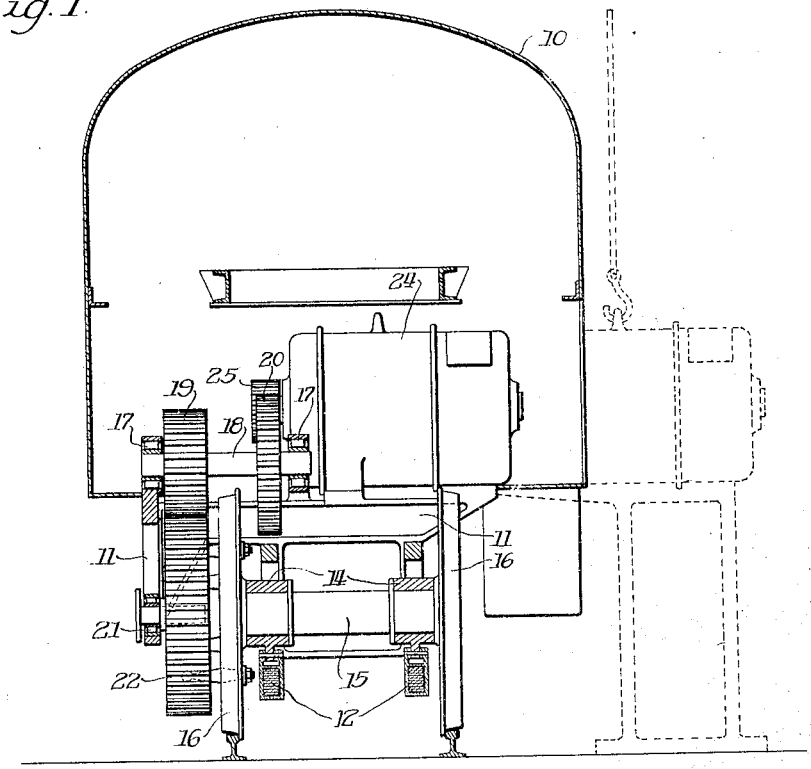
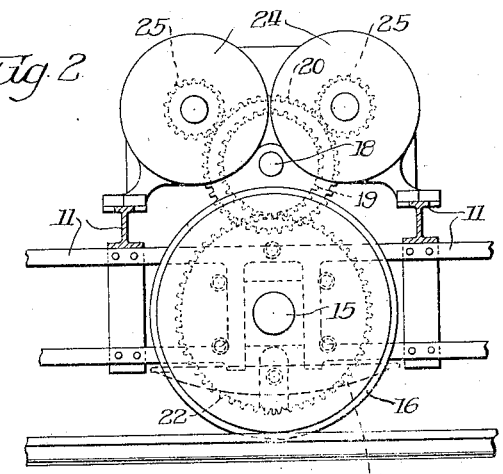
Inventor:
Jacob Buchli.
Witness:
R. Burkhardt Patented May 29, 1928.

1,671,099

UNITED STATES PATENT OFFICE.

JACOB BUCHLI, OF WINTERTHUR, SWITZERLAND, ASSIGNOR TO AKTIENGESELLSCHAFT BROWN BOVERI & CIE., OF BADEN, SWITZERLAND, A JOINT-STOCK COMPANY.

ELECTRIC-LOCOMOTIVE CONSTRUCTION.

Application filed May 9, 1927, Serial No. 190,116, and in Germany May 10, 1926.

This invention relates to the construction of electric locomotives and has to do particularly with the construction and arrangement of the driving motors and the driving gear whereby power is transmitted to the traction wheels. It pertains particularly to locomotives of the individual axle drive type.

The general object of the invention is the provision of a construction which will accommodate considerable speed reduction between the driving motors and the traction wheels, which affords stable bearing mountings for the reducing gear, which permits balancing of the motors and the driving gear on the frame and which permits accessibility to the motors and the driving gear and the removal and replacement of the motors without interference with other apparatus installed in the locomotive.

Another object is the provision of a construction having the aforementioned advantages and which affords spring support for the motors and the driving gear with respect to the traction wheels.

Other and further objects of the invention will be pointed out or indicated hereinafter or will be apparent to one skilled in the art upon an understanding of the invention or its employment in practice.

In the drawing forming a part of this specification, I illustrate, in diagrammatic fashion, one assembly of apparatus embodying the invention, but it is to be understood that other arrangements may be made without departing from the spirit of the invention or the scope of the appended claims.

In the drawing,

Fig. 1 is a diagrammatic illustration in the nature of a transverse sectional elevational view of portions of a locomotive showing a motor and driving gear and the driven traction wheels in elevation; and Fig. 2 is a side elevational detail illustrating the relationship of the motors, the locomotive frame, driving gear and the traction wheel.

The individual axle drive in electric traction vehicles, such as locomotives, possesses many distinct advantages in the direction of simplicity and reliability. In such drives the power is transmitted from the driving motor or motors to a traction wheel or traction wheels through the medium of gearing which has a universal connection with the traction wheel permitting displacement of the motor and transmission gearing relative to the axle of the traction wheel. The present invention is designed to contribute certain advantageous improvements to drives of this sort, rendering it possible to apply increased power to the traction wheels without involving additional difficulties in the assembly of the apparatus or the inspection, repair or removal of the motors.

The nature of the invention will be ascertained by reference to the assembly illustrated in the drawing. In this, the reference numeral 10 designates a portion of the locomotive body which is carried on a frame 11 supported on springs 12 which are mounted on journal boxes 14 of the traction wheel axles 15. Thus the frame is permitted the desirable spring movement with respect to the traction wheels 16. On portions of the frame 11 are supported bearings 17 in which is journaled a transmission shaft 18 carrying gears 19 and 20. The frame also carries a bearing 21 in which is journaled a drive gear 22 which is connected to the traction wheel 16 by a universal connection such as that illustrated and described in my U. S. Patent No. 1,298,881. The motor 24 is mounted on the spring supported frame and has a pinion 25 which meshes with the transmission gear 20. The transmission gear 19 is held in mesh with the drive gear 22. The transmission gears 19 and 20 are disposed on opposite sides of the traction wheel 16 and may be of the appropriate size to attain the desired speed reduction ratio between the motor and the drive gear 22. The transmission gear 20 thus may be of suitable diameter to permit the disposal of the motor 24 in a position entirely outside the peripheries of the two traction wheels. This is illustrated in Fig. 2 wherein are shown a pair of twin motors 24 mounted in a unitary frame and both driving the same traction wheel axle through the medium of their pinions 25 which both mesh with transmission gear 20. In this figure the pinions, transmission gears and drive gear are illustrated in dot and dash lines. By virtue of such mounting of the motors and the driving gear, the motors may be arranged laterally of the longitudinal center line of the frame to such extent as may be necessary to counterbalance the weight of the gearing. Moreover, the motors may be removed laterally from the frame and from the associated mechanism, as illustrated in the dotted lines in Fig. 1, thus avoiding any necessity for dismantling or displacement of any of the other apparatus above them in the locomotive. It also permits the improvement of the kinetic balance in a locomotive in which a plurality of the axles are driven, by permitting the placing of the driving gear alternately at opposite sides of the locomotive on successive axles. There are no conditions restricting the length and diameters of the motors, and owing to the high center of gravity, improved running characteristics may be obtained. The bearings which carry the transmission gear shaft and the drive pinion 22, all being mounted on the frame in fixed relationship to one another, maintain the intermeshing gears in accurate mesh, and the spring support of all of the driving gear makes for elimination of wear on its parts. The construction permits the use of a large gear ratio and the use of torque-cushioning features of strong construction.

What I claim is:

1. In an electric locomotive, in combination, a traction wheel, a spring supported frame, a motor mounted on the frame entirely outside the peripheral area of the wheel, a transmission shaft journaled on the frame, transmission gears carried by said shaft on opposite sides of the wheel, one of said transmission gears having operative connection with the motor, and a drive gear having driving connection with the other transmission gear and universal driving connection with the traction wheel.

2. In an electric motor, in combination, a traction wheel, a spring supported frame, a drive gear journalled on the frame and having universal driving connection with the wheel, a drive shaft journalled on the frame, transmission gears carried by said drive shaft at opposite sides of the wheel, one of said transmission gears meshing with said drive gear, and a motor mounted on the frame entirely outside the peripheral area of the wheel and withdrawable laterally from the frame, said motor having driving connection with the other of said transmission gears.

3. In an electric locomotive, in combination, a traction wheel, a spring supported frame, a drive gear journalled on the frame and having universal driving connection with the wheel, a transmission shaft journaled on the frame, transmission gears carried by said shaft, one of said transmission gears having driving connection with the drive gear, and a motor mounted on the frame and having driving connection with the other transmission gear.

4. In an electric locomotive, in combination, a traction wheel, a spring supported frame, a drive gear journaled on the frame and having universal driving connection with the wheel, a transmission shaft journaled on the frame, a transmission gear carried by said shaft and having driving connection with the drive gear, a second transmission gear carried by said transmission shaft, and a pair of motors mounted on the frame entirely outside the peripheral area of the wheel and having driving connection with said second transmission gear.

In testimony whereof I have hereunto subscribed my name this 27 day of April A. D. 1927 at Zurich, Switzerland.

JACOB BUCHLI.